May 8, 1923.
R. K. LUSE
1,454,590
ATTACHMENT FOR LATHES OR SIMILAR MACHINES
Filed May 31, 1921
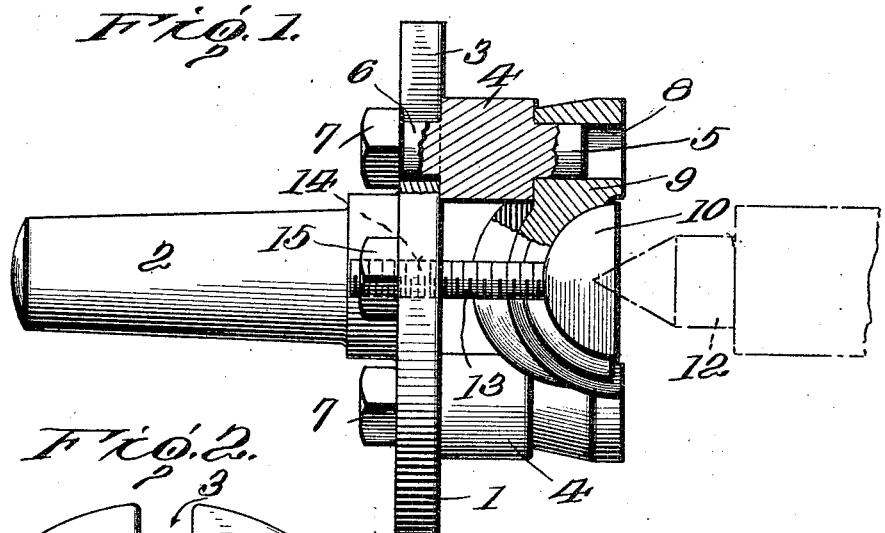
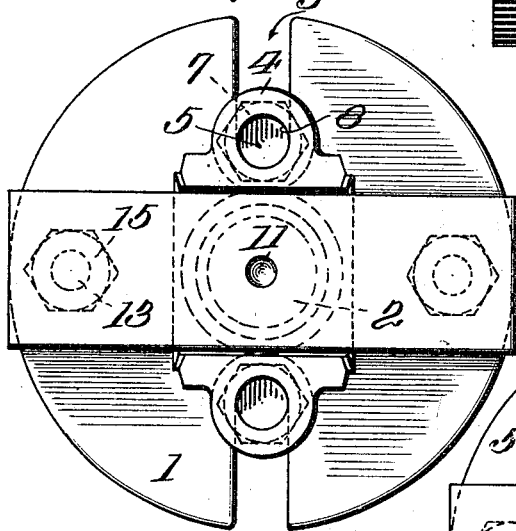
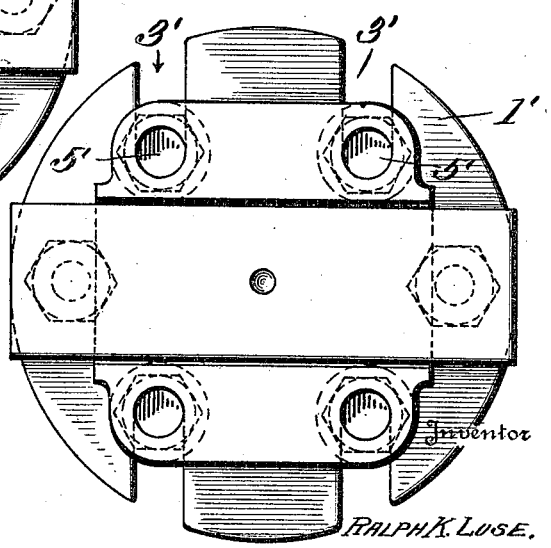
Inventor
RALPH K. LUSE.
By
Attorney Patented May 8, 1923.

1,454,590

UNITED STATES PATENT OFFICE.

RALPH K. LUSE, OF OXFORD, IOWA.

ATTACHMENT FOR LATHES OR SIMILAR MACHINES.

Application filed May 31, 1921. Serial No. 473,735.

*To all whom it may concern:*

Be it known that I, RALPH K. LUSE, a citizen of the United States, residing at Oxford, in the county of Johnson and State of Iowa, have invented certain new and useful Improvements in Attachments for Lathes or Similar Machines, of which the following is a specification, reference being had therein to the accompanying drawing.

This invention relates to certain new and useful improvements in attachments for lathes, the object being to provide a device for machining or truing the flat engaging surface of connecting rod bearing caps, main journal bearing caps or any other bearing caps as used in connection with internal combustion engines or any other machinery and particularly those bearing caps in which shims are not used but it is, of course, understood that I do not wish to confine my invention to any particular construction of bearing.

Another object of my invention is to provide a device capable of holding a bearing cap for taking a cut off of a flat engaging surface with a cap by a lathe or tool moved transversely to the axis of rotation, the surface thus formed being parallel to and true with the surface against which the bearing engages, thereby eliminating hand filing or draw filing to accomplish this result and providing means for the bearing to be resurfaced so that only the proper metal will be removed as will cause the bearing cap to seat itself on the engaging base with the proper clearance with a good running fit of the pin or journal.

Another and further object of the invention is to provide means for adjusting the engaging surfaces of the bearing cap in order to bring it parallel with the surface of the table or the machine tool or lathe as the case may be, thereby enabling a true surface to be maintained parallel to the original surface.

Another object of the invention is to provide a device which is exceedingly simple and cheap in construction and one which can be readily placed in position on various machines, such as lathes, engine lathes, grinders, shapers, planers or milling machines.

Other and further objects and advantages of the invention will be hereinafter set forth and the novel features thereof defined by the appended claims.

In the drawings,

Figure 1 is a side elevation, partly in section, of my improved attachment showing the head provided with a spindle adapted to be inserted in the lathe head;

Figure 2 is an end elevation; and

Figure 3 is an end elevation of a construction of device for holding a bearing cap with more than two holes.

In carrying out my invention I preferably employ a circular head 1 which is adapted to be secured to the machine so as to rotate with the revolving spindle thereof and in the drawing I have shown the head provided with a tapering spindle 2 adapted to be secured within the spindle of the lathe.

The circular head 1 is provided with oppositely disposed radially extended slots 3 in which are adjustably mounted cylindrical members 4 having positioning pins 5 at their outer ends and provided with reduced threaded portions 6 at their inner ends on which are mounted nuts 7 for clamping the supports 4 in their adjusted position within the head 1.

The positioning pins 5 are adapted to enter the openings 8 of the cap bearing 9 to be faced and it will be seen that by adjusting the reduced portion 6 of the members 4 within the slots 3 the device can be adjusted to receive bearing caps of different sizes.

After the bearing cap has been inserted on the pins 5 a semi-circular retaining member 10 is inserted within the semi-circular bearing portion of the bearing cap and this semi-circular member is preferably provided with a tapering recess 11 into which is adapted to extend the tail center 12 of a lathe for holding the bearing in its proper position on the positioning pins so that the flat surface can be milled by an ordinary lathe tool so that the proper amount will be taken off to produce a tight bearing when the same is placed in position.

In order to enable the device to be used on other machines not employing a tail stock I provide the retaining member 10 with threaded pins 13 which extend through suitable openings 14 formed in the circular head 1 and are adapted to be secured by nuts 15 so as to clamp the bearing 9 in position on the pins.

The retaining member 10 is formed with a curved face corresponding to the curvature of the bearing to be replaced and it is of course understood that it can be enlarged as bearings of different sizes are placed in position to be ground.

In Figure 3 I have shown a similar construction of head especially adapted to be used for grinding bearing caps employing four bolts for fastening the same in position and the construction of all of the parts are the same with the exception that the head 1' is provided with parallel slots 3' to receive supporting members carrying positioning pins 5'. This construction provides means for grinding bearing caps of a larger size than illustrated in Figures 1 and 2, the operation of grinding or cutting the flat engaging surfaces being the same when placed in position on machines.

From the foregoing description it will be seen that I have provided a device for holding the bearing cap in position to be operated upon by a cutting tool in such a manner that the flat engaging surface can be reduced without hand filing whereby I am able to accomplish the desired result very quickly, thereby saving a great deal of time now required in fitting bearings and while I have shown certain details of construction of the various parts, I do not wish to limit myself to these details of construction as I am aware that various changes can be made without departing from the spirit of my invention. By adjusting the members 4 the flat engaging surface of the bearing cap may be brought into parallelism with the surface of the table or machine tool or when used in a lathe may be brought into a plane of rotation thus enabling a true surface to be machined parallel to the original surface, only so much metal being removed as will allow of the desired running clearance when the cap is secured in position on the base.

What I claim is:—

1. A device of the kind described comprising a head adapted to be attached to a revolving member of a machine, positioning pins adjustably mounted within said head for supporting a bearing cap and means for holding said bearing cap in position upon said pins.

2. A device of the kind described comprising a head having a bearing cap support and a member having a curved surface corresponding in shape to the bearing surface of the bearing cap for holding said bearing cap in position upon said support.

3. A device of the kind described comprising a head having a spindle, said head being provided with slots, bearing cap supports adjustably mounted within said slots and means for holding the bearing cap in position upon said supports.

4. An attachment for lathes or similar machines having a revolving spindle and a tail center; comprising a head adapted to be carried by the spindle, bearing cap supports carried by said head and a member for holding said bearing cap on said support adapted to be engaged by the tail center of the machine.

5. A device of the kind described comprising a head having bearing cap supports adjustably mounted therein, a member semi-circular in cross section adapted to fit within said bearing and means for holding said member within said bearing for positioning said bearing cap on said support.

6. A device of the kind described comprising a circular head having a spindle, said head being provided with oppositely disposed slots, supports adjustably mounted in said slots provided with positioning pins adapted to support and position a bearing cap and a semi-circular member adapted to fit within the bearing portion of said bearing cap carrying pins for fastening the same.

7. A device of the kind described comprising a head having means for attaching the same to a revolving member of a machine, said head being provided with oppositely disposed slots, supports adjustably mounted within said slots having positioning pins for holding and positioning a bearing on said support, a semi-circular member adapted to be arranged within the bearing portions of said bearing cap and threaded pins carried by said semi-circular member extending through said head having nuts for locking said semi-circular member to said head for holding said bearing caps in position upon said supports.

8. A device of the kind described comprising a head adapted to be attached to a revolving member of a machine, pins for supporting and positioning a bearing cap upon said head and means for holding said bearing cap in position upon said pins.

In testimony whereof I hereunto affix my signature.

RALPH K. LUSE.